UNITED STATES PATENT OFFICE.

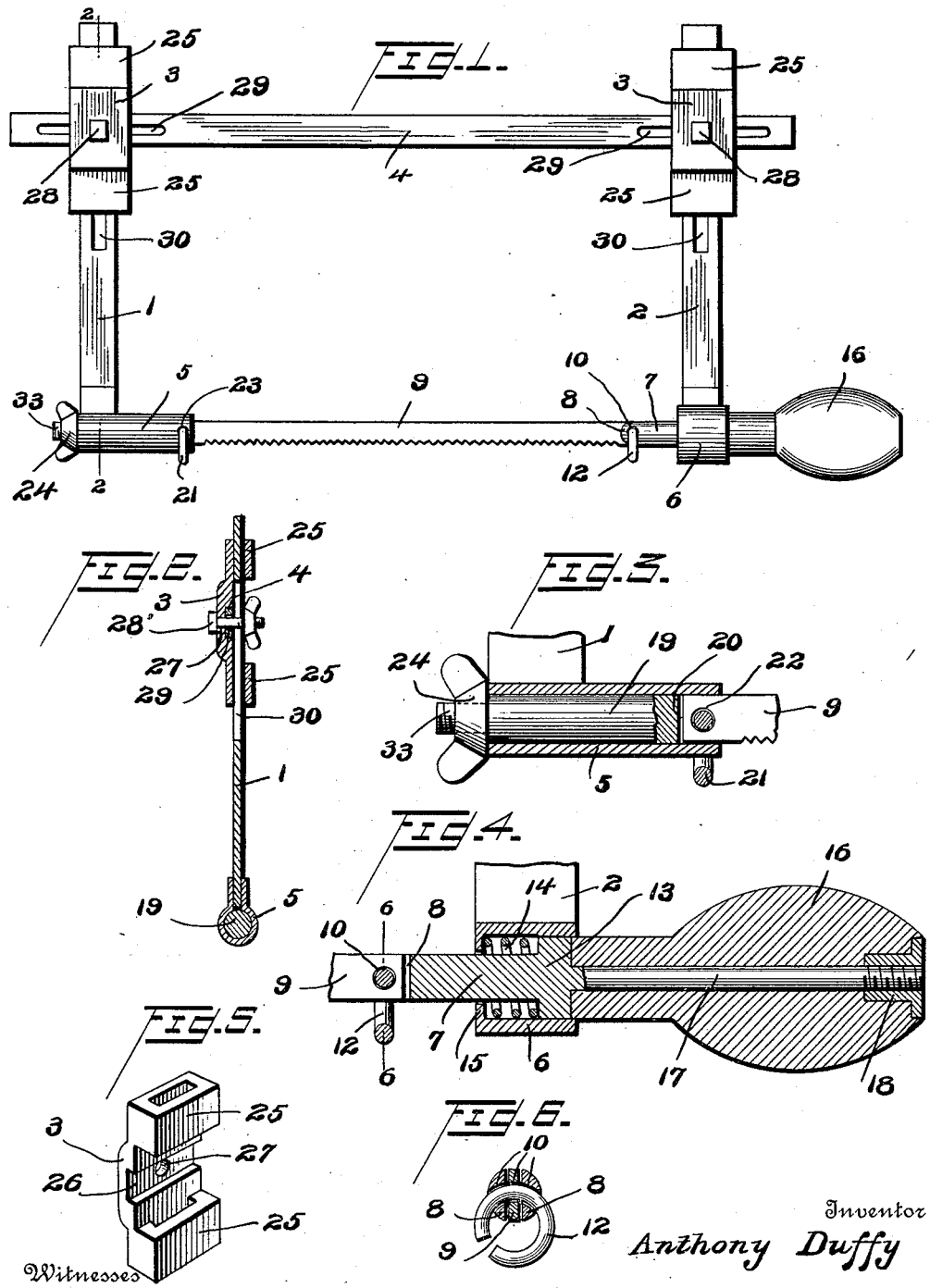

ANTHONY DUFFY, OF PHILADELPHIA, PENNSYLVANIA.

HACKSAW.

1,087,648.  Specification of Letters Patent.  Patented Feb. 17, 1914.

Application filed April 5, 1913.  Serial No. 759,000.

*To all whom it may concern:*

Be it known that I, ANTHONY DUFFY, a citizen of the United States, residing at Philadelphia, in the county of Philadelphia and State of Pennsylvania, have invented certain new and useful Improvements in Hacksaws, of which the following is a specification.

My invention relates to improvements in hack-saws, the object of the invention being to provide a hack-saw which is capable of adjustment longitudinally to accommodate various lengths of saw, and which is also capable of adjustment laterally so that the bar of the saw carrying frame located in parallelism with the saw may be adjusted toward and away from the saw to allow the desired depth of cut.

A further object is to provide a saw of this character of extremely simple inexpensive construction, strong and durable in use.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements. Fig. 2 is a view in section on the line 2—2 of Fig. 1. Fig. 3 is a fragmentary view in longitudinal section through the sleeve 5 and its adjusting rod. Fig. 4 is a fragmentary view in longitudinal section through the handle. Fig. 5 is a perspective view of one of the bar couplings, and Fig. 6 is a view in section on the line 6—6 of Fig. 4.

1 and 2 represent parallel end bars which are connected by my improved couplings 3 with a longitudinal bar 4. The bars 1, 2, and 4, with the couplings 3 constitute a rectangular frame, and the free end of bar 1 is provided with a sleeve 5 alining with a collar 6 on the free end of bar 2. Through collar 6, a rod 7 projects and is provided with a bifurcated end 8 to receive one end of a saw blade 9 and said end 8 and blade 9 are provided with registering openings 10 for the reception of a ring 12 to lock the saw to the rod.

Rod 7 between its ends is formed with an enlarged head 13, and a coiled spring 14 in the collar 6 bears at one end against an internal flange 15 in the collar 6, and at its other end against said head 13, pressing the rod 7 in a direction to exert a pull on the saw blade. A handle 16 is secured on the reduced outer end 17 of rod 7 in any approved manner. I have shown a nut 18 screwed onto the rod for the purpose. In sleeve 5, a longitudinally movable rod 19 is located, and is provided with a bifurcated end 20 to receive the opposite end of saw blade 9 and a ring 21 similar to ring 12 is adapted to be projected through registering openings 22 in the saw blade 9 and rod 19, and through slots 23 in the sleeve to effectually secure the saw blade and rod together. The outer end of rod 19 is reduced in diameter and screw-threaded as shown at 33 for the reception of a wing nut 24 to adjust the rod longitudinally and secure the saw at the necessary tension.

The couplings 3 above referred to are formed with alined rectangular sleeves 25 at their ends, through which the bars 1 and 2 project. Intermediate the ends of each coupling, transverse grooves 26 are provided to accommodate bar 4, so that bars 1, 2, and 4, cross each other, but lie snugly against each other. Each coupling 3 has a central opening 27 to receive a bolt 28. These bolts 28 are projected through longitudinal slots 29 in the bar 4, and through longitudinal slots 30 in bars 1 and 2. In other words, the bars 1 and 4, and 2 and 4 are crossed and connected by the couplings 3, which permit the bars 1 and 2 to be adjusted toward and away from each other to lengthen or shorten the frame, and which also permit bar 4 to be adjusted toward and away from the saw. By means of these couplings, lateral as well as longitudinal adjustment is permitted, and two bolts and nuts control this entire adjustment. The bar 4 may therefore be moved any desired distance from the saw 9 in accordance with the cut, and various other adjustments may be had in accordance with the length of the saw blade.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A saw of the character described, comprising end bars, saw supporting means at the free ends of said end bars, a longitudinal bar, and couplings connecting the longitudinal bar with the end bars, and permitting adjustment of the end bars relative to each other and the longitudinal bar relative to the end bars, substantially as described.

2. A saw of the character described, comprising end bars, saw supporting means at the free ends of said end bars, a longitudinal bar, and couplings connecting the longitudinal bar with the end bars, said bars having longitudinal slots therein, bolts projected through the couplings and through the slots, nuts on the bolts clamping the bars together at various longitudinal and lateral adjustments of the bars, substantially as described.

3. A saw of the character described, comprising end bars, saw supporting means at the free ends of said end bars, a longitudinal bar, and couplings connecting the longitudinal bar with the end bars, said couplings having transverse grooves at their intermediate portions receiving the longitudinal bar and having alined sleeves at their ends receiving the end bars, said bars having longitudinal slots therein, and clamping bolts in the slots and projecting through the couplings, whereby said bars may be adjusted both longitudinally and laterally relative to each other, substantially as described.

In testimony whereof I have signed my name to this specification in the presence of two subscribing witnesses.

ANTHONY DUFFY.

Witnesses:
  S. W. FOSTER,
  CHAS. E. POTTS.

---

Copies of this patent may be obtained for five cents each, by addressing the "Commissioner of Patents, Washington, D. C."